United States Patent
Huang et al.

(10) Patent No.: US 9,276,925 B2
(45) Date of Patent: *Mar. 1, 2016

(54) MANAGING CLOUD ZONES

(71) Applicant: Citrix Systems, Inc., Fort Lauderdale, FL (US)

(72) Inventors: Alex Huang, Cupertino, CA (US); Chiradeep Vittal, Cupertino, CA (US); William Chan, Santa Clara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/472,371

(22) Filed: Aug. 29, 2014

(65) Prior Publication Data

US 2014/0373120 A1 Dec. 18, 2014

Related U.S. Application Data

(63) Continuation of application No. 13/459,830, filed on Apr. 30, 2012, now Pat. No. 8,856,885.

(51) Int. Cl.
| | |
|---|---|
| *H04L 29/06* | (2006.01) |
| *G06F 21/33* | (2013.01) |
| *G06F 9/50* | (2006.01) |
| *H04L 12/24* | (2006.01) |
| *H04L 29/08* | (2006.01) |

(52) U.S. Cl.
CPC .............. *H04L 63/08* (2013.01); *G06F 9/5072* (2013.01); *G06F 21/33* (2013.01); *H04L 41/046* (2013.01); *H04L 67/02* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 6,061,796 | A * | 5/2000 | Chen | H04L 12/4641 726/15 |
| 8,412,945 | B2 * | 4/2013 | Sweet et al. | 713/176 |
| 8,590,014 | B1 * | 11/2013 | Haugsnes | 726/3 |
| 8,645,701 | B2 * | 2/2014 | Gould et al. | 713/176 |
| 8,745,384 | B2 * | 6/2014 | Persaud | G06F 21/606 713/165 |
| 8,832,219 | B2 * | 9/2014 | Morgan | 709/216 |
| 2009/0319688 | A1 * | 12/2009 | Mason et al. | 709/242 |
| 2011/0099616 | A1 * | 4/2011 | Mazur | H04L 63/0846 726/7 |
| 2011/0184993 | A1 * | 7/2011 | Chawla et al. | 707/802 |
| 2012/0005724 | A1 * | 1/2012 | Lee | 726/1 |
| 2012/0030740 | A1 * | 2/2012 | Baptist | H04L 63/08 726/6 |

(Continued)

OTHER PUBLICATIONS

Karabulut, Yuecel; Nassi, Ike. Secure Enterprise Services Consumption for SaaS Technology Platforms. IEEE 25th International Conference on Data Engineering. 2009. ICDE '09. Relevant pp. 1749-1756. http://ieexplore.ieee.org/stamp/stamp.jsp?tp=&arnumber=4812601.*

(Continued)

*Primary Examiner* — Jeremiah Avery
(74) *Attorney, Agent, or Firm* — Banner & Witcoff, Ltd.

(57) ABSTRACT

Methods and systems for managing cloud zones are described herein. A management server for a cloud of computing resources may add private zones to the cloud. The private zones may contain computers owned and operated by a user of the cloud, such as a cloud customer, rather than the cloud operator. The management server may manage the computing resources in the private zone by sending commands to an agent, which in turn relays the management server's commands to the individual computing resources. The agent may be authenticated using a token.

17 Claims, 8 Drawing Sheets

(56) References Cited

U.S. PATENT DOCUMENTS

| | | | | |
|---|---|---|---|---|
| 2012/0072985 | A1* | 3/2012 | Davne | H04L 63/0272 726/22 |
| 2012/0233678 | A1* | 9/2012 | Pal | G06F 21/445 726/7 |
| 2012/0266231 | A1* | 10/2012 | Spiers | H04L 63/0218 726/12 |
| 2012/0331532 | A1* | 12/2012 | Walters | H04L 12/66 726/5 |
| 2013/0042115 | A1* | 2/2013 | Sweet | H04L 63/0428 713/176 |
| 2013/0117564 | A1* | 5/2013 | Chang | G06F 9/45558 713/168 |
| 2013/0185729 | A1* | 7/2013 | Vasic | G06F 9/5072 718/104 |

OTHER PUBLICATIONS

Abuhussein, Abdullah; Bedi, Harkeerat; Shiva, Sajjan. Evaluating Security and Privacy in Cloud Computing Services: A Stakeholder's Perspective. 2012 International Conference for Internet Technology and Secured Transactions. Relevant pp. 388-395. http://ieeexplore.ieee.org/stamp/stamp.jsp?tp=&arnumber=6470836.*

Jensen, Meiko; Schwenk, Jorg; Gruschka, Nils; Iacono, Luigi Lo. On Technical Security Issues in Cloud Computing. IEEE International Conference on Cloud Computing, 2009. CLOUD '09. Relevant pp. 109-116. http://ieeexplore.ieee.org/stamp/stamp.jsp?tp=&arnumber=5284165.*

Cloud.com—CloudStack, Administration Guide, Version 2.1, Oct. 4, 2010, pp. 1-53.

Manage All Your Clouds with RightScale, MultiCloud Platform, accessed Mar. 14, 2012 from http://www.rightscale.com/products/multicloud-platform.php, pp. 1-9.

"Security Management interoperability challenges for Collaborative Clouds," Michael Kretzschmar et al; Institut fur Technishe Informatik, 2010 4th International DMTF Academic Workshop on Systems and Virtualization Management; 2010.

* cited by examiner

601 — Large Virtual Machine [4 GHz CPU, 4 GB Mem]   $.50 per hour    Select
*High Performance Package with Quad-Core Procs. and larger cache*

602 — Large Virtual Machine [4 GHz CPU, 4 GB Mem]   $.40 per hour    Select
*Standard Package with Dual-Core Procs.*
*Juniper Network Hardware*

. . .

FIG. 6

MANAGING CLOUD ZONES

CROSS-REFERENCE TO RELATED APPLICATION

This application is a continuation of and claims priority to U.S. patent application Ser. No. 13/459,830, filed Apr. 30, 2012, and entitled "MANAGING CLOUD ZONES," the disclosure of which is incorporated by reference herein in its entirety and made part hereof.

FIELD

This application generally relates to creating and managing virtual machines. In particular, this application relates to provisioning virtual machines on a cloud customer's physical resources by adding the cloud customer's physical resources to a cloud as a private zone.

BACKGROUND

Traditionally, personal computers included operating systems, applications, and user settings for a single user. Personal computers were generally both used and managed by their owners. However, many organizations are now using clouds of computing resources to fulfill their computing needs. The clouds of computing resources generally allow for the operating systems, applications, and user settings of multiple users to be included on a single physical machine. Desktop virtualization technology allows multiple instances of an operating system to be kept separate, so the activities of one user may not affect the experience of other users. Cloud computing environments allow for computers owned by the cloud operator to be managed by the cloud operator but used by cloud users, who may be customers of the cloud operator.

SUMMARY

In light of the foregoing background, the following presents a simplified summary of the present disclosure in order to provide a basic understanding of some aspects described herein. This summary is not an extensive overview, and it is not intended to identify key or critical elements or to delineate the scope of the claims. The following summary merely presents various described aspects in a simplified form as a prelude to the more detailed description provided below.

According to one aspect of the disclosure, a management server for a cloud of physical computing resources may manage private resources of a cloud customer in addition to the resources of the cloud operator. The private resources may be organized into one or more private zones of the cloud.

According to another aspect of the disclosure, one or more of the private zones may be located behind a firewall, thereby making the resources inaccessible to the management server. One or more agents may initiate a communications session with the management server. The communications session may be maintained continuously, thereby enabling communications from the management server to reach the agent. The agent may relay communications from the management server to the appropriate physical resources.

According to a still further aspect of the disclosure, the management server may provide a token for use by an authorized agent. The management server may authenticate an agent using the token before managing the resources behind the agent.

BRIEF DESCRIPTION OF THE DRAWINGS

Figure 1:
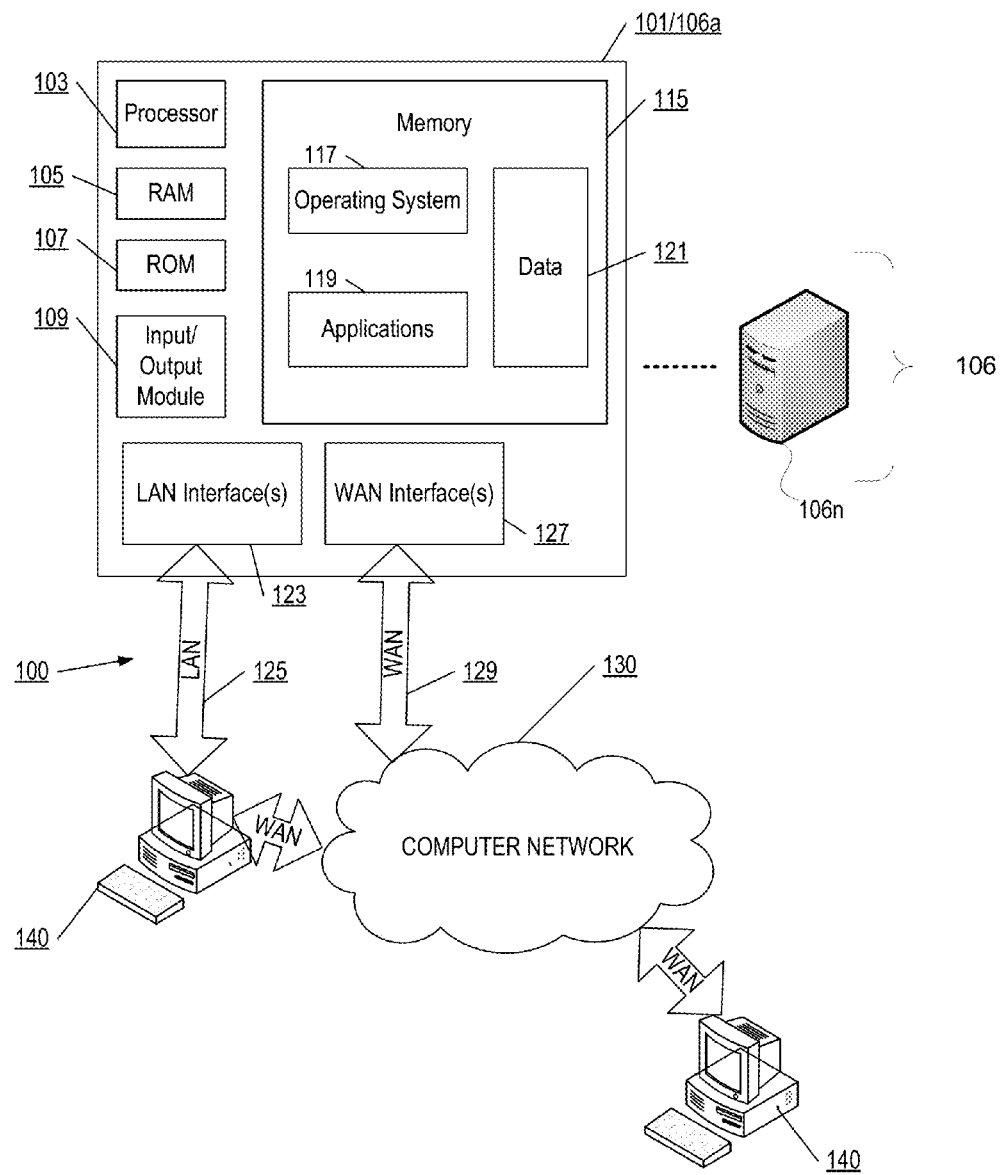

Having thus described aspects of the disclosure in general terms, reference will now be made to the accompanying drawings, which are not necessarily drawn to scale, and wherein:

FIG. 1 illustrates an example operating environment in which various aspects of the disclosure may be implemented.

Figure 2:
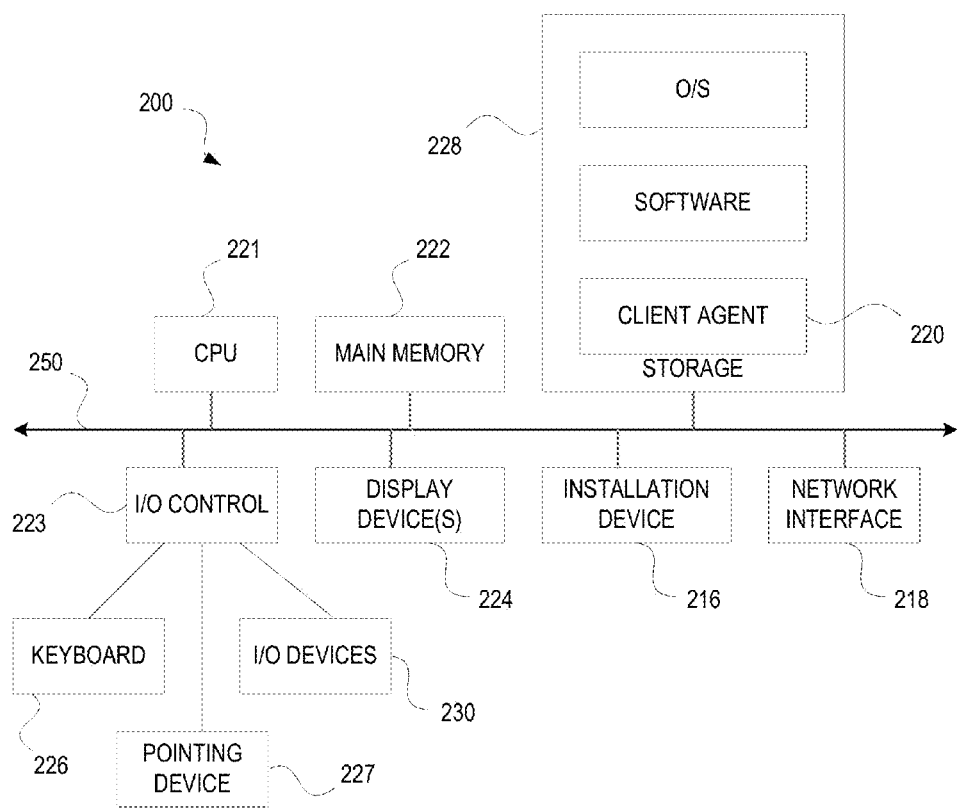

FIG. 2 illustrates a computing device that may be used in accordance with one or more illustrative aspects described herein.

Figure 3:
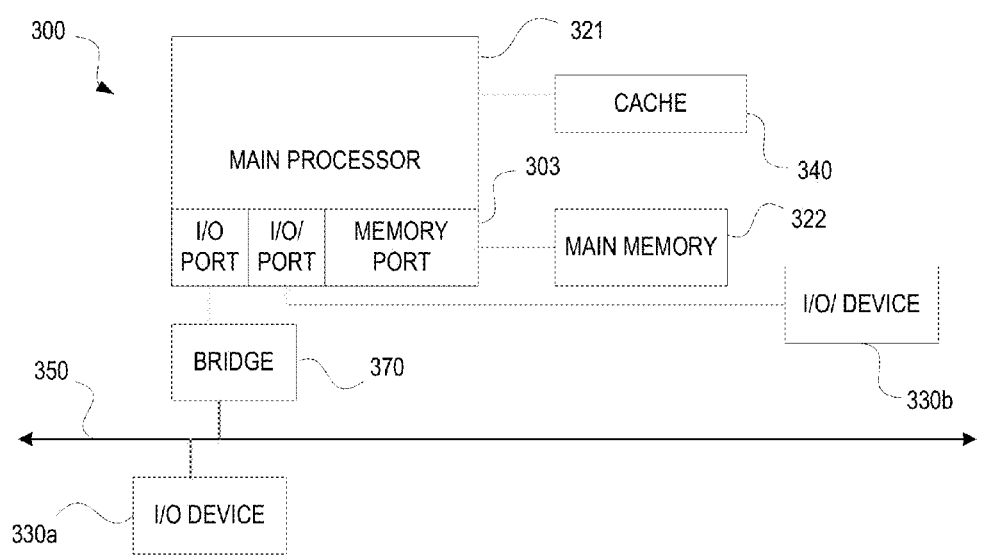

FIG. 3 illustrates a computing device that may be used in accordance with one or more illustrative aspects described herein.

Figure 4:
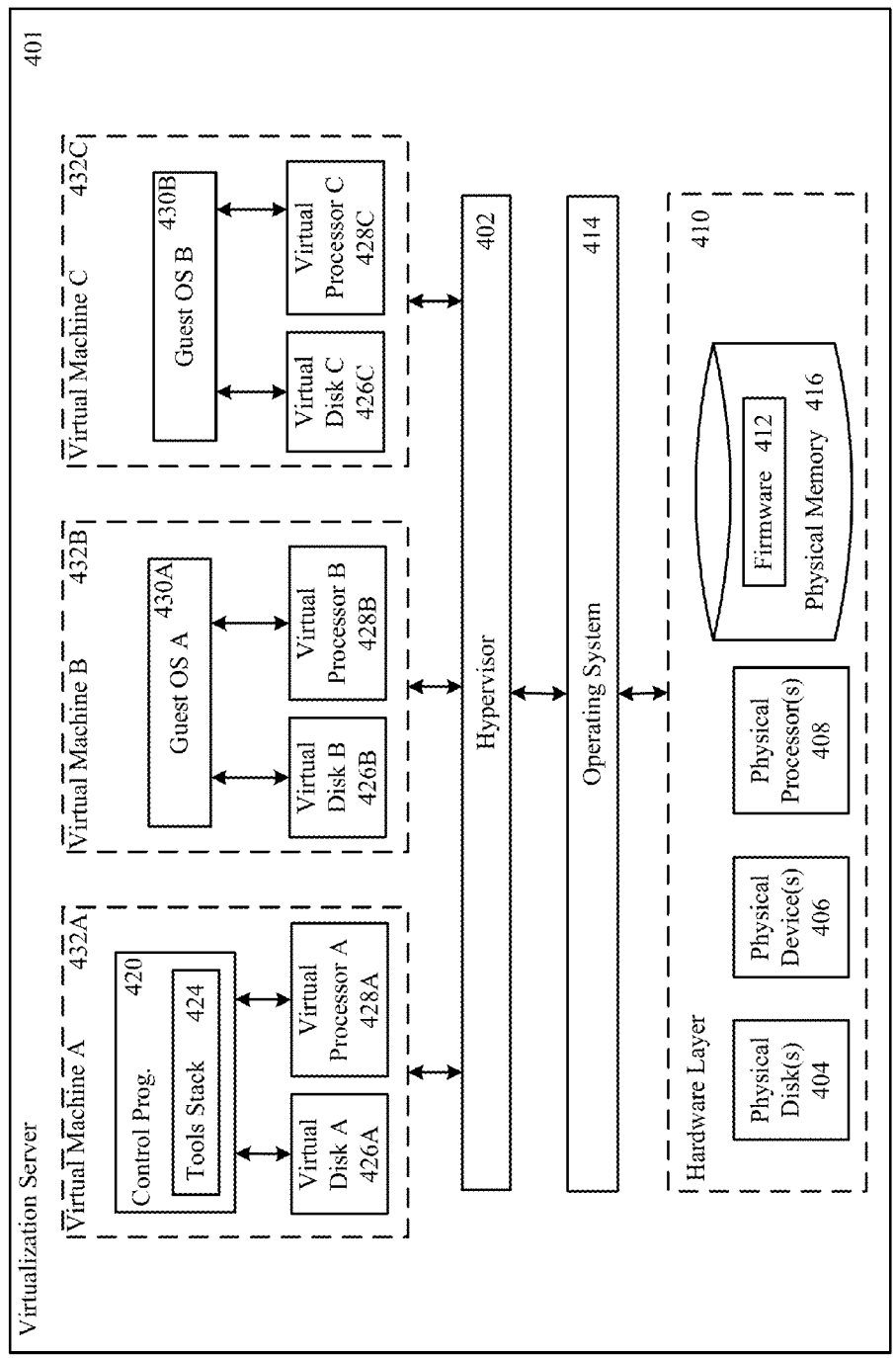

FIG. 4 is a block diagram that depicts embodiments of a virtualization server in accordance with one or more illustrative aspects described herein.

Figure 5:
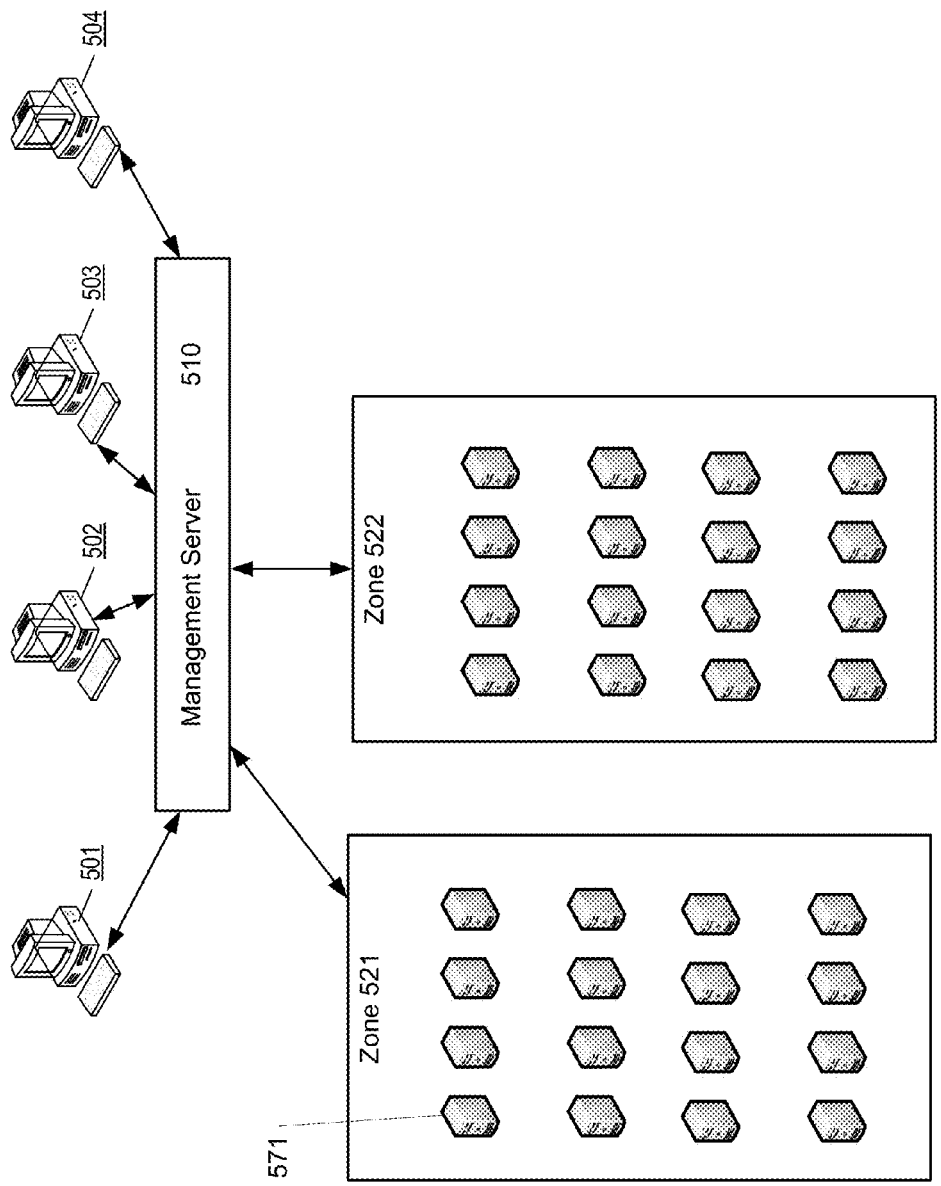

FIG. 5 illustrates an example of a cloud computing environment.

FIG. 6 illustrates an example of a user interface that may be provided by a management server.

Figure 7:
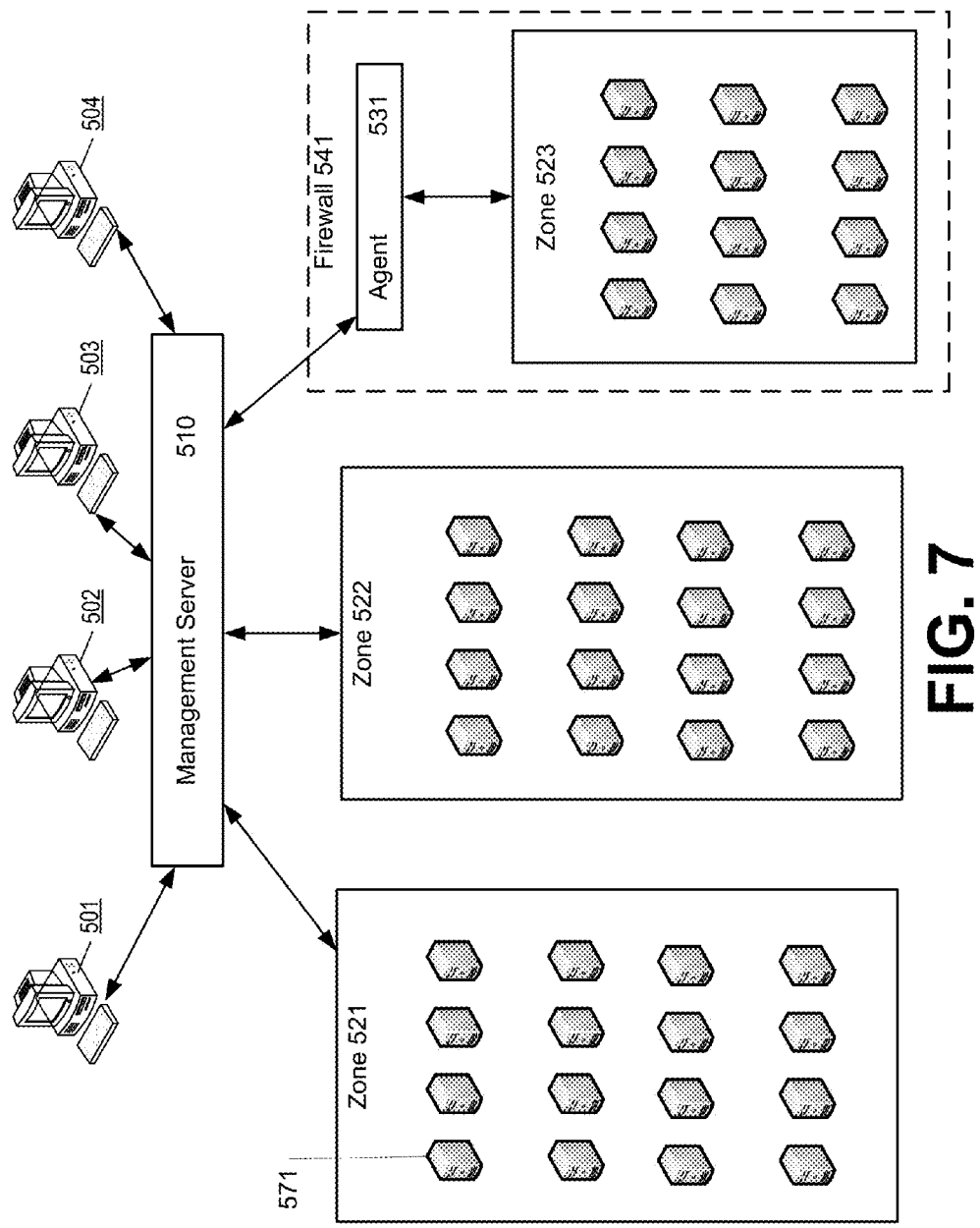

FIG. 7 illustrates a cloud computing environment that includes a private zone.

Figure 8:
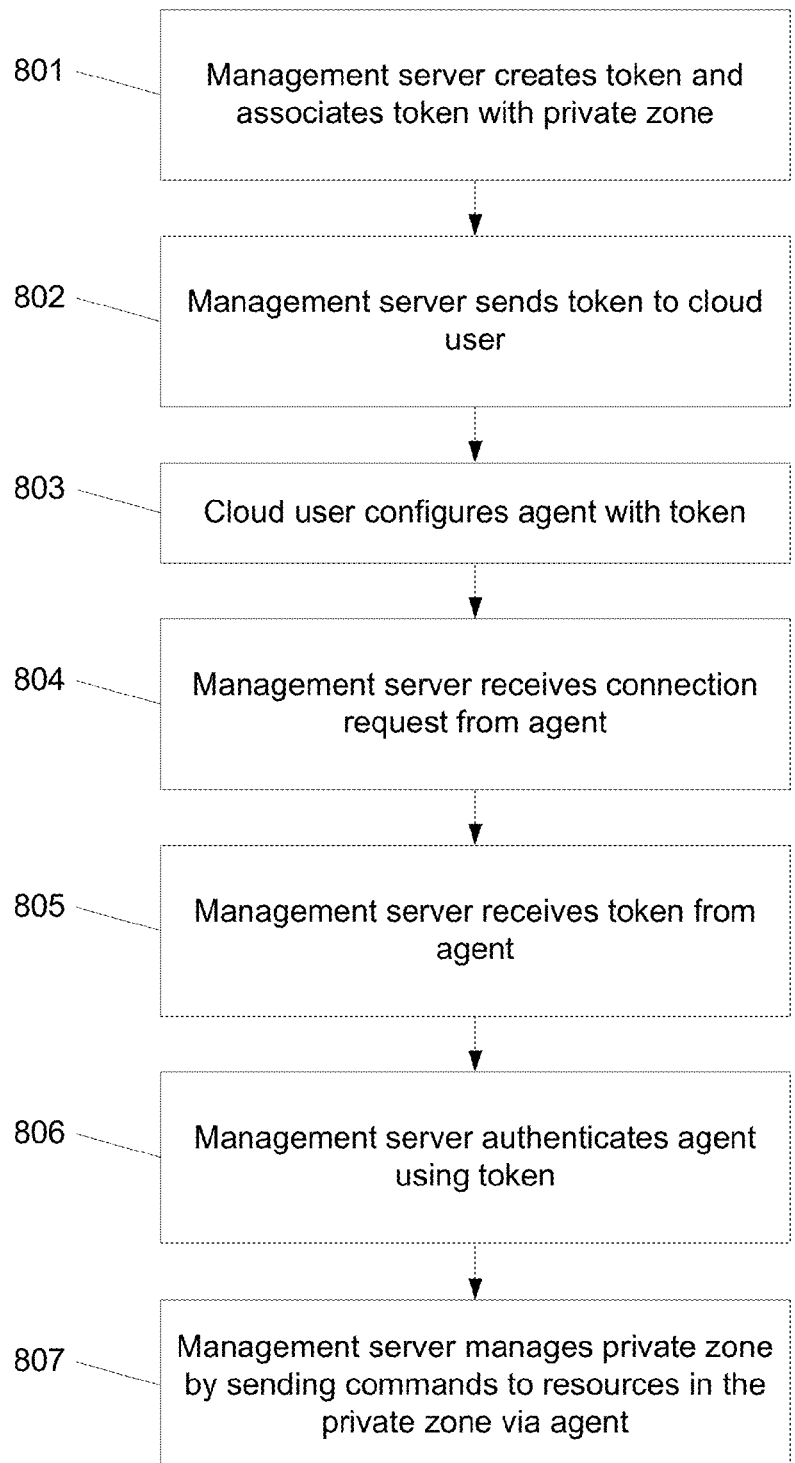

FIG. 8 illustrates a method for adding a private zone to a cloud.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates an example block diagram of a generic computing device 101 (e.g., a computer server 106*a*) in an example computing environment 100 that may be used according to one or more illustrative embodiments of the disclosure. According to one or more aspects, generic computing device 101 may be a server 106*a* in a single-server or multi-server desktop virtualization system (e.g., a cloud system) configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 140 (also referred to as client devices). The terminals 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or terminals 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In one embodiment, the computing environment 100 can include an appliance installed between the server(s) 106 and client machine(s) 140. This appliance can manage client/server connections, and in some cases can load balance client connections amongst a plurality of backend servers 106.

The client machine(s) 140 can in some embodiment be referred to as a single client machine 140 or a single group of client machines 140, while server(s) 106 may be referred to as a single server 106 or a single group of servers 106. In one embodiment a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine(s) 140; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 140 that displays application output generated by an application remotely executing on a server 106 or other remotely located machine. In these embodiments, the client device 140 can display the application output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106, for example, in a cloud computing environment. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc.; Riverbed Technology, Inc.; F5 Networks, Inc.; or Juniper Networks, Inc. Some embodiments include a first server 106A that receives requests from a client machine 140, forwards the request to a second server 106n, and responds to the request generated by the client machine 140 with a response from the second server 106n. The first server 106A can acquire an enumeration of applications available to the client machine 140 and well as address information associated with an application server 106 hosting an application identified within the enumeration of applications. The first server 106A can then present a response to the client's request using a web interface, and communicate directly with the client 140 to provide the client 140 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include: a bus network topology; a star network topology; a ring network topology; a repeater-based network topology; or a tiered-star network topology. Additional embodiments may include a network of mobile telephone networks that use a protocol to communicate among mobile devices, where the protocol can be any one of the following: AMPS; TDMA; CDMA; GSM; GPRS UMTS; or any other protocol able to transmit data among mobile devices.

Illustrated in FIG. 2 is an embodiment of a computing device 200, where the client machine 140 and server 106 illustrated in FIG. 1 may be deployed as and/or executed on any embodiment of the computing device 200 illustrated and described herein. Included within the computing device 200 is a system bus 250 that communicates with the following components: a central processing unit 221; a main memory 222; storage memory 228; an input/output (I/O) controller 223; display devices 224A-224N; an installation device 216; and a network interface 218. In one embodiment, the storage memory 228 includes: an operating system, software routines, and a client agent 220. The I/O controller 223, in some embodiments, is further connected to a keyboard 226, and a pointing device 227. Other embodiments may include an I/O controller 223 connected to more than one input/output device 230A-230N.

FIG. 3 illustrates one embodiment of a computing device 300, where the client machine 140 and server 106 illustrated in FIG. 1 can be deployed as and/or executed on any embodiment of the computing device 300 illustrated and described herein. Included within the computing device 300 is a system bus 350 that communicates with the following components: a bridge 370, and a first I/O device 330a. In another embodiment, the bridge 370 is in further communication with the main central processing unit 321, where the central processing unit 321 can further communicate with a second I/O device 330b, a main memory 322, and a cache memory 340. Included within the central processing unit 321, are I/O ports, a memory port 303, and a main processor.

Embodiments of the computing machine 300 can include a central processing unit 321 characterized by any one of the following component configurations: logic circuits that respond to and process instructions fetched from the main memory unit 322; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 322 may include any combination of the following: a microprocessor, a microcontroller, a central processing unit with a single processing core, a central processing unit with two processing cores, or a central processing unit with more than one processing core.

While FIG. 3 illustrates a computing device 300 that includes a single central processing unit 321, in some embodiments the computing device 300 can include one or more processing units 321. In these embodiments, the computing device 300 may store and execute firmware or other executable instructions that, when executed, direct the one or more processing units 321 to simultaneously execute instructions or to simultaneously execute instructions on a single piece of data. In other embodiments, the computing device 300 may store and execute firmware or other executable instructions that, when executed, direct the one or more processing units to each execute a section of a group of instructions. For example, each processing unit 321 may be instructed to execute a portion of a program or a particular module within a program.

In some embodiments, the processing unit 321 can include one or more processing cores. For example, the processing unit 321 may have two cores, four cores, eight cores, etc. In one embodiment, the processing unit 321 may comprise one or more parallel processing cores. The processing cores of the processing unit 321, may in some embodiments access available memory as a global address space, or in other embodiments, memory within the computing device 300 can be segmented and assigned to a particular core within the processing unit 321. In one embodiment, the one or more processing cores or processors in the computing device 300 can each access local memory. In still another embodiment, memory within the computing device 300 can be shared amongst one or more processors or processing cores, while other memory can be accessed by particular processors or subsets of processors. In embodiments where the computing device 300 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 300 includes one or more processing units 321, or a processing unit 321 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 300, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 321. In other embodiments, the computing device 300 can include one or more processing units 321, where at least one processing unit 321 is dedicated to processing and rendering graphics.

One embodiment of the computing machine 300 includes a central processing unit 321 that communicates with cache memory 340 via a secondary bus also known as a backside bus, while another embodiment of the computing machine 300 includes a central processing unit 321 that communicates with cache memory via the system bus 350. The local system bus 350 can, in some embodiments, also be used by the central processing unit to communicate with more than one type of I/O device 330a-330n. In some embodiments, the local system bus 350 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 300 include an I/O device 330a-330n that includes a video display 224 that communicates with the central processing unit 321. Still other versions of the computing machine 300 include a processor 321 connected to an I/O device 330a-330n via any one of the following connections: HyperTransport, Rapid I/O, or InfiniBand. Further embodiments of the computing machine 300 include a processor 321 that communicates with one I/O device 330a using a local interconnect bus and a second I/O device 330b using a direct connection.

The computing device 300, in some embodiments, includes a main memory unit 322 and cache memory 340. The cache memory 340 can be any memory type, and in some embodiments can be any one of the following types of memory: SRAM; BSRAM; or EDRAM. Other embodiments include cache memory 340 and a main memory unit 322 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 321 that can access the main memory 322 via: a system bus 350; a memory port 303; or any other connection, bus or port that allows the processor 321 to access memory 322.

One embodiment of the computing device 200/300 provides support for any one of the following installation devices 216: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 220, or any portion of a client agent 220. The computing device 200/300 may further include a storage device 228 that can be either one or more hard disk drives, or one or more redundant arrays of independent disks; where the storage device is configured to store an operating system, software, programs applications, or at least a portion of the client agent 220. A further embodiment of the computing device 200, 300 includes an installation device 216 that is used as the storage device 228.

The computing device 200, 300 may further include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 200, 300 includes a network interface 218 able to communicate with additional computing devices 200', 300' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 218 can comprise any one of: a built-in network adapter; a network interface card; a PCM-CIA network card; a card bus network adapter; a wireless network adapter; a USB network adapter; a modem; or any other device suitable for interfacing the computing device 200, 300 to a network capable of communicating and performing the methods and systems described herein.

Embodiments of the computing device 200, 300 include any one of the following I/O devices 230a-230n: a keyboard 226; a pointing device 227; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 223 may in some embodiments connect to multiple I/O devices 230a-230n to control the one or more I/O devices. Some embodiments of the I/O devices 230a-230n may be configured to provide storage or an installation medium 216, while others may provide a universal serial bus (USB) interface for receiving USB storage devices such as the USB Flash Drive line of devices manufactured by Twintech Industry, Inc. Still other embodiments include an I/O device 230 that may be a bridge between the system bus 250 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 200, 300 can connect to multiple display devices 224a-224n, in other embodiments the computing device 100 can connect to a single display device 224, while in still other embodiments the computing device 200, 300 connects to display devices 224a-224n that are the same type or form of display, or to display devices that are different types or forms. Embodiments of the display devices 224a-224n can be supported and enabled by the following: one or multiple I/O devices 230a-230n; the I/O controller 223; a combination of I/O device(s) 230a-230n and the I/O controller 223; any combination of hardware and software able to support a display device 224a-224n; any type and/or form of video adapter, video card, driver, and/or library to interface, communicate, connect or otherwise use the display devices 224a-224n. The computing device 200, 300 may in some embodiments be configured to use one or multiple display devices 224A-224N, these configurations include: having multiple connectors to interface to multiple display devices 224A-224N; having multiple video adapters, with each video adapter connected to one or more of the display devices 224A-224N; having an operating system configured to support multiple displays 224A-224N; using circuits and software included within the computing device 200 to connect to and use multiple display devices 224A-224N; and executing software on the main computing device 200 and multiple secondary computing devices to enable the main computing device 200 to use a secondary computing device's display as a display device 224A-224N for the main computing device 200. Still other embodiments of the computing device 200 may include multiple display devices 224A-224N provided by multiple secondary computing devices and connected to the main computing device 200 via a network.

In some embodiments, the computing machine 200 can execute any operating system, while in other embodiments the computing machine 200 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 200 can execute multiple operating systems. For example, the computing machine 200 can execute PARALLELS or another virtualization platform that can execute or manage a virtual machine executing a first operating system, while the computing machine 200 executes a second operating system different from the first operating system.

The computing machine 200 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95c1, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 200 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some embodiments, the computing device 200 may have different processors, operating systems, and input devices consistent with the device. For example, in one embodiment, the computing device 200 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 200 is a mobile device, such as a JAVA-enabled cellular telephone or personal digital assistant (PDA), such as the i55sr, i58sr, i85s, i88s, i90c, i95c1, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 200 is a mobile device manufactured by Nokia of Finland, or by Sony Ericsson Mobile Communications AB of Lund, Sweden.

In still other embodiments, the computing device 200 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 200 is a smart phone, Pocket PC, Pocket PC Phone, or other handheld mobile device supporting Microsoft Windows Mobile Software. Moreover, the computing device 200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 200 is a digital audio player. In one of these embodiments, the computing device 200 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 200 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 200 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 200 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 200 comprises a combination of devices, such as a mobile phone combined with a digital audio player or portable media player. In one of these embodiments, the computing device 200 is a Motorola RAZR or Motorola ROKR line of combination digital audio players and mobile phones. In another of these embodiments, the computing device 200 is an iPhone smartphone, manufactured by Apple Computer of Cupertino, Calif.

FIGS. 1-3 show a high-level architecture of an illustrative desktop virtualization system. As shown, the desktop virtualization system may be single-server or multi-server system, or cloud system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Illustrated in FIG. 4 is one embodiment of a computer device 401 configured as a virtualization server in a virtualization environment, for example, a single-server, multi-server, or cloud computing environment. The virtualization server 401 illustrated in FIG. 4 can be deployed as and/or implemented by one or more embodiments of the server 106 illustrated in FIG. 1 or the computing devices 200 and 300 illustrated in FIGS. 2 and 3. Included in virtualization server 401 is a hardware layer that can include one or more physical disks 404, one or more physical devices 406, one or more physical processors 408 and a physical memory 416. In some embodiments, firmware 412 can be stored within a memory element in the physical memory 416 and can be executed by one or more of the physical processors 408. The virtualization server 401 may further include an operating system 414 that may be stored in a memory element in the physical memory 416 and executed by one or more of the physical processors 408. Still further, a hypervisor 402 may be stored in a memory element in the physical memory 416 and can be executed by one or more of the physical processors 408. Executing on one or more of the physical processors 408 may be one or more virtual machines 432A-C (generally 432). Each virtual machine 432 may have a virtual disk 426A-C and a virtual processor 428A-C. In some embodiments, a first virtual machine 432A may execute, on a virtual processor 428A, a control program 420 that includes a tools stack 424. In other embodiments, one or more virtual machines 432B-C can executed, on a virtual processor 428B-C, a guest operating system 430A-B.

Further referring to FIG. 4, and in more detail, the virtualization server 401 may include a hardware layer 410 with one or more pieces of hardware. In some embodiments, the hardware layer 410 can include one or more physical disks 404, one or more physical devices 406, one or more physical processors 408, and one or more memory 416. Physical components 404, 406, 408, and 416 may include, for example, any of the components described above in FIGS. 1-3. For instance, physical disks 404 may include permanent memory storage, temporary memory storage, disk drives (e.g. optical, floppy, tape), hard disks, external hard drives, flash memory, network-attached storage, a storage-area network, or any other storage repository that the virtualization server 401 can access. Physical devices 406 may include any device included in the virtualization server 401 and/or any combination of devices included in the virtualization server 401 and external devices that communicate with the virtualization server 401. A physical device 406 may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 401. The physical memory 416 in the hardware layer 410 may include any type of memory. The physical memory 416 may store data, and in some embodiments may store one or more programs, or set of executable instructions. FIG. 4 illustrates an embodiment where firmware 412 is stored within the physical memory 416 of the virtualization server 401. Programs or executable instructions stored in the physical memory 416 can be executed by the one or more processors 408 of the virtualization server 401.

Virtualization server 401 may also include a hypervisor 402. In some embodiments, hypervisor 402 may be a program executed by processors 408 of the virtualization server 401 to create and manage any number of virtual machines 432. The hypervisor 402 can be referred to as a virtual machine monitor, or platform virtualization software. In some embodiments, a hypervisor 402 can be any combination of executable instructions and hardware that monitors virtual machines executing on a computing machine. Hypervisor 402 may be Type 2 hypervisor, or a hypervisor that executes within an operating system 414 executing on the virtualization server 401. A Type 2 hypervisor, in some embodiments, executes within an operating system 414 environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 401 in a virtualization environment may include a Type 1 hypervisor (Not Shown). A Type 1 hypervisor may execute on the virtualization server 401 by directly accessing the hardware and resources within the hardware layer 410. That is, while a Type 2 hypervisor 402 accesses system resources through a host operating system 414, a Type 1 hypervisor may directly access all system resources without needing a host operating system 414. Thus, a host operating system 414 may not be present. A Type 1 hypervisor may execute directly on one or more physical processors of 408 the virtualization server 401, and may include program data stored in the physical memory 416.

The hypervisor 402, in some embodiments, can provide virtual resources to operating systems 430 or control programs 420 executing on virtual machines 432 in any manner that simulates the operating systems 430 or control programs 420 having direct access to system resources. System resources can include: physical devices 406; physical disks; physical processors; physical memory 416 and any other component included in the virtualization server 401 hardware layer 410. In these embodiments, the hypervisor 402 may be used to emulate virtual hardware, partition physical hardware, virtualize physical hardware, or execute virtual machines that provide access to computing environments. In still other embodiments, the hypervisor 402 controls processor scheduling and memory partitioning for a virtual machine 432 executing on the virtualization server 401. Hypervisor 402 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a virtualization server 401 executes a hypervisor 402 that creates a virtual machine platform on which guest operating systems may execute. In these embodiments, the virtualization server 401 can be referred to as a host server. An example of such a virtualization server is the XEN SERVER provided by Citrix Systems, Inc., of Fort Lauderdale, Fla.

The hypervisor 402 may create one or more virtual machines 432B-C (generally 432) in which guest operating systems 430 execute. In some embodiments, the hypervisor 402 may load a virtual machine image to create a virtual machine 432. In other embodiments, the hypervisor 402 may executes a guest operating system 430 within the virtual machine 432. In still other embodiments, the virtual machine 432 may execute the guest operating system 430.

In addition to creating virtual machines 432, the hypervisor 402 may control the execution of at least one virtual machine 432. In other embodiments, the hypervisor 402 may present at least one virtual machine 432 with an abstraction of at least one hardware resource provided by the virtualization server 401 (e.g., any hardware resource available within the hardware layer 410). In other embodiments, the hypervisor 402 may control the manner in which virtual machines 432 access the physical processors 408 available in the virtualization server 401. Controlling access to the physical processors 408 may include determining whether a virtual machine 432 should have access to a processor 408, and how physical processor capabilities are presented to the virtual machine 432.

As shown in the example of FIG. 4, the virtualization server 401 may host or execute one or more virtual machines 432. A virtual machine 432 is a set of executable instructions that, when executed by a processor 408, imitate the operation of a physical computer such that the virtual machine 432 can execute programs and processes much like a physical computing device. While FIG. 4 illustrates an embodiment where a virtualization server 401 hosts three virtual machines 432, in other embodiments the virtualization server 401 can host any number of virtual machines 432. The hypervisor 402, in some embodiments, provides each virtual machine 432 with a unique virtual view of the physical hardware, memory, processor and other system resources available to that virtual machine 432. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 402 may create one or more unsecure virtual machines 432 and one or more secure virtual machines 432. Unsecure virtual machines 432 may be prevented from accessing resources, hardware, memory locations, and programs that secure virtual machines 432 may be permitted to access. In other embodiments, the hypervisor 402 may provide each virtual machine 432 with a substantially similar virtual view of the physical hardware, memory, processor and other system resources available to the virtual machines 432.

Each virtual machine 432 may include a virtual disk 426A-C (generally 426) and a virtual processor 428A-C (generally 428.) The virtual disk 426, in some embodiments, is a virtualized view of one or more physical disks 404 of the virtualization server 401, or a portion of one or more physical disks 404 of the virtualization server 401. The virtualized view of the physical disks 404 can be generated, provided and managed by the hypervisor 402. In some embodiments, the hypervisor 402 provides each virtual machine 432 with a unique view of the physical disks 404. Thus, in these embodiments, the virtual disk 426 included in each virtual machine 432 can be unique when compared with the other virtual disks 426.

A virtual processor 428 can be a virtualized view of one or more physical processors 408 of the virtualization server 401. In some embodiments, the virtualized view of the physical processors 408 can be generated, provided and managed by the hypervisor 402. In some embodiments, the virtual processor 428 has substantially all of the same characteristics of at least one physical processor 408. In other embodiments, the virtual processor 408 provides a modified view of the physical processors 408 such that at least some of the characteristics of the virtual processor 428 are different than the characteristics of the corresponding physical processor 408.

FIG. 5 illustrates an example of a cloud computing environment. As seen in FIG. 5, client computers 501-504 may communicate with management server 510. Management server 510 may be implemented on one or more than one physical server. Client computers 501-504 may connect to management server 510 via the Internet. In some environments, access to management server 510 may be restricted to only client computers on one or more networks.

A user of a client computer may, for example, request access to one or more of the computing resources managed by management server 510. Management server 510 may run, for example, CLOUDSTACK by Citrix System or OPENSTACK. It may manage computing resources such as host computers, data storage devices, and networking devices, such as firewalls, network address translators, load balancers, virtual private network (VPN) gateways, Dynamic Host Configuration Protocol (DHCP) routers, and the like.

A user of a client computer may request access to one of the computing resources managed by management server 510, such as host computer 571. A host computer may be, for example, a virtualization server capable of running one or more virtual machines. A user of a client computer may request, for example, access to an existing virtual machine or that a virtual machine be created or destroyed. The physical resources selected to fulfill a user request may be governed solely by management server 510. However, in some embodiments the user may identify a specific host or request that virtual resources be created within a specific group of hosts. A management server may allocate resources in the group requested, or it may allocate resources in a different group of hosts to, for example, avoid overloading a physical computing resource. The management server then sends the appropriate commands to the selected resource. For example, the management server may command a host or other resource to create, start, stop, or delete a virtual machine; to create, alter, or remove virtual disks; to create, alter, or remove virtual network interfaces, etc. These commands may include additional details. For example, a command to create a virtual machine may specify the amount of memory and processing resources it will have available to it, the software that will be included on it, the virtual and/or physical disk(s) it will have access to, etc.

In a computing cloud, such as the one managed by management server 510, a zone is a collocated set of physical computing resources. Each zone may be geographically dispersed from each other zone. For example, zone 521 may be located in California, and zone 522 may be located in Maryland. Management sever 510 may be located in a third zone (not shown). Each zone may include an internal network that interfaces with devices that are outside of the zone, such as management server 510, through a gateway. Users of the computing cloud may be aware of the distinctions between zones, but they do not need to be aware of the distinctions. For example, a user may simply request that a virtual machine having a set amount of memory and processing power be allocated. Management server 510 may present a user with the user interface illustrated in FIG. 6, which shows two options (601 and 602) for virtual machines but does not indicate the location of the physical resources that would be used to create either virtual machine. Alternatively, a user may be able to request that a virtual machine (or other resource) be allocated in a specific zone or subset of a zone.

The cloud illustrated in FIG. 5 allows management server 510 to perform all of the administrative tasks for the resources under its control. By providing a single interface for managing the resources of the cloud, cloud users may achieve both improved scalability and reduced maintenance compared to managing resources individually or managing groups of resources, such as zone 521 or 522, individually. The interface provided by management server 510 may be a graphical user interface, such as the one illustrated in FIG. 6. Other examples of interfaces that may be provided by management server 510 include text-based user interfaces and application programming interfaces (APIs). The interface of management server 510 may be public, thereby allowing anyone to make requests of the management server.

The users of a cloud may be unrelated. For example, users may be affiliated with different companies, and the information on the virtual machines or storage of any one user may be hidden from any other user. By sharing a single management server (or set of servers), these users may further reduce maintenance costs by effectively sharing the burden of running management server 510 and the resources it controls.

Some cloud users may wish to have their computing tasks performed on physical resources that the user controls instead of on the physical resources provided by a cloud operator. This may be due to, for example, a concern that data on a physical resource of the cloud operator may be compromised and made available to another cloud user. A cloud user may also wish to perform computing tasks on its own physical resources because those resources may be located nearer to the rest of the user's network, thereby enabling faster connections, lower latency, etc. Finally, a cloud user may wish to use its own physical resources because it can provide the resources at a lower cost than accessing equivalent resources from the cloud operator.

A cloud user desiring to have computing tasks performed on its own physical resources may still take advantage of the improved scalability and reduced maintenance of sharing management server 510. The cloud user can achieve these advantages, by adding its physical resources to the pool of resources managed by management server 510.

FIG. 7 illustrates a cloud computing environment that includes private zone 523. FIG. 7 depicts the same cloud computing environment as FIG. 5, but private zone 523 has been added. Zone 523 may include the physical resources of an individual user of the cloud. The hosts in zone 523 may be integrated with the rest of the cloud and used in the same way as the hosts in zones 521 or 522. For example, management server 510 may control what data is stored in zone 523 and how the physical resources of zone 523 are allocated across users. The owner of the hosts in zone 523 may be compensated for the computing workloads that management server 510 places on the physical resources in zone 523. For example, a cloud operator may pay the owner of the hosts in zone 523 for the computing workloads of other users that are fulfilled by the resources in zone 523.

In some cases, management server 510 may not place computing workloads from other users on the resources of zone 523. In other words, the resources of zone 523 may be reserved exclusively for use by the owner of the resources. Even where this exclusive arrangement is used, the owner of the resources in zone 523 may achieve the advantages of managing resources via management server 510 and the advantages of having access to the rest of the cloud. For example, the user may utilize all of the resources in zone 523 but still need access to additional computing resources. Management server 510 may direct requests for access to additional computing resources to hosts outside of zone 523, such as to host 571.

As illustrated in FIG. 7, a private zone, such as zone 523, may be located behind a firewall (541). Firewall 541 may make the hosts of zone 523 inaccessible from management server 510. Agent 531 may be used to facilitate communications between management server 510 and the hosts or other resources of zone 523. Although a single agent (531) is illustrated in FIG. 7, multiple agents may exist. Further, the functionality of the agent may be combined with other devices. For example, each host of zone 523 may run an instance of the agent, or the functionality of the agent may be combined with one or more gateways or network switches. The functionality of the agent may be implemented in software, hardware, or a combination thereof.

An agent may be located outside of firewall 541 but be able to communicate with the resources within zone 523 due to, for example, a rule on firewall 541 allowing incoming traffic from the agent to pass. Alternatively, an agent may be located inside of firewall 541. An agent (531) inside of firewall 541 may still be publically accessible, even though the resources of zone 523 might not be. Finally, agent 531 may be publically inaccessible. However, despite blocking incoming connection requests to agent 531, the firewall may allow outgoing communications from agent 531 to pass. In this case, because management server 510 may not be able to initiate a connection with agent 531, the agent may instead initiate a connection with management server 510. By maintaining this connection, management server 510 may pass instructions to the resources in zone 523 via the open connection with agent 531. Agent 531 may initiate a connection with management server 510 using a certain port or protocol in order to ensure that the agent's outgoing communications are not blocked by the firewall. For example, a firewall may restrict outgoing traffic to certain ports. A firewall may also block outgoing traffic that does not conform to certain protocols. Agent 531 may avoid these rules by connecting on commonly used ports and/or using commonly used protocols. For example, agent 531 may initiate an HTTP connection with management server 510 using port 80. Another example is that agent 531 may initiate an HTTPS connection with management server 510 using port 443. An agent may support multiple protocols and/or ports for communicating with management server 510. The protocols and/or ports used by the agent may be user configurable. The protocols and/or ports used by the agent may also be configured automatically. For example, if a connection attempt using a first protocol and/or port is unsuccessful, the agent may attempt to use different communication protocols and/or different ports until a connection with management server 510 is established. An example of a method that may be used to initiate the connection between the management server and the agent is described below with reference to FIG. 8.

An agent, such as agent 531, might not provide a management interface. Instead, an agent may merely facilitate management by server 510 by allowing commands from management server 510 to reach the resources of a private zone. An agent may translate commands from management server 510 into another format, but, unlike management server 510, the agent might not generate its own commands for allocating the physical resources of zone 523. Thus, all of the resources of the cloud illustrated in FIG. 7 may be controlled via a single management interface. Interactions with the management interface may result in management commands being issued from management server 510.

Although a single private zone (523) is illustrated in FIG. 7, a cloud may contain any number of private zones. Although some private zones may be associated with a single cloud user, each private zone may be associated with a different user from each other private zone.

FIG. 8 illustrates a method for adding a private zone to a cloud. In step 801 the management server creates a token and associates the token with a private zone. This may include, for example, storing rules for how the private zone may be accessed. For example, only requests from certain users may be fulfilled using resources from the private zone. Step 801 may occur in response to a user requesting for authorization to add a private zone to the cloud via a management interface.

In step 802, the management server sends the token to the cloud user. The token may be sent in the form of a series of bits. The token may also be incorporated in agent software. For example, the management server may configure agent software with the token and send the configured software to the user in step 802.

In step 803, the cloud user configures agent software with the token. If the software was sent to the user pre-configured in step 802, then the user only needs to run the agent software on an appropriate computer. Otherwise, the user may input the token or otherwise provide the token to the agent.

In step 804, the management server receives a connection request from the agent. By initiating the connection request, the agent avoids the possibility of communications from the management server being blocked by a firewall. Where an agent is able to receive incoming connection requests from the management server, the management server may initiate the connection. The connection may be a secure connection, such as a secure VPN (virtual private network) connection, an HTTPS (secure hypertext transfer protocol) connection, or any other type of secure connection. The connection may be kept open continuously to allow for communications from the management server to be received by the agent at any time.

In step 805, the management server receives the token from the agent. The management server authenticates the agent using the token in step 806. This authentication step allows the management server to know that the agent, and the resources behind the agent, are in fact authorized to receive computing workloads from one or more users who interact with the management server. Sending computing workloads to an unauthorized agent would risk exposing a user's potentially sensitive data to unauthorized parties. The token may be transmitted in its original form. The management server may authenticate the agent by checking that the token received from the agent matches the token that was sent in step 802. Alternatively, the token may be used as a string that is then digitally signed by the agent. In this example, the management server may authenticate the agent by verifying the token's digital signature. Where the token is digitally signed, a new token may be provided to the agent for signing at the beginning of each connection. Also, where the token is digitally signed, steps 801 and 803 may involve configuring the management server and agent to use and verify a digital signature.

In step 807, the management server manages the private zone by sending commands to resources in the private zone via the agent, such as a command to start a virtual machine. In some instances, these commands may include commands that cause the resources of the private zone to identify themselves and/or report information about themselves. Information about the resources in the private zone may also be gathered by the agent and subsequently transmitted by the agent to the management server. Examples of the types of additional information that may be gathered includes hardware information, such as the amount of memory or processing capacity of a host; software information, such as the hypervisor software or other operating system(s) running on a resource; and utilization information, such as information about the virtual machines or other virtual resources already running or allocated on a host. While this information may be automatically discovered, some or all of this information may also be input by a user. Updates to the information about the resources of the private zone may be transmitted periodically. The updates may take the form of an entirely new dataset. Alternatively, updates may indicate only information that has changed.

The management server may keep track of the above-described information about the resources of the private zone using a database. By keeping track of each of the resources in the private zone and the hardware, software, and/or utilization information for each resource, the management server may allocate requests for resources appropriately. For example, if one host is running five virtual machines and is low on memory, the management server may select another host that is running fewer virtual machines and/or has more memory available. If permitted by the rules governing the private zone, the host that is selected may be located in another zone.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the following claims.

What is claimed is:

1. A method, comprising:
receiving, by one or more computing devices and from an agent, associated with a private zone of computing resources, that facilitates communications between the one or more computing devices and at least a portion of computing resources of the private zone, a request to add the at least a portion of computing resources to a cloud of computing resources that is managed by the one or more computing devices and comprises shared computing resources and private computing resources; and responsive to the request and a determination that addition of the at least a portion of computing resources to the cloud is authorized:
adding, by the one or more computing devices, the at least a portion of computing resources to the cloud;
generating, by the one or more computing devices, an authentication token; and
communicating, by the one or more computing devices and to the agent, the authentication token.

2. The method of claim 1, comprising receiving, by the one or more computing devices, a request to utilize one or more computing resources of the at least a portion of computing resources.

3. The method of claim 2, comprising, responsive to a determination that the request to utilize is associated with the private zone, communicating, by the one or more computing devices and to the agent, commands for the one or more computing resources.

4. The method of claim 3, comprising:
receiving, by the agent and from the one or more computing devices, the commands for the one or more computing resources;
translating, by the agent, the commands for the one or more computing resources into commands formatted for the one or more computing resources; and
communicating, by the agent and to the one or more computing resources, the commands formatted for the one or more computing resources.

5. The method of claim 2, comprising determining, by the one or more computing devices, that the request to utilize comprises at least one of the authentication token or information generated using the authentication token.

6. The method of claim 1, wherein the at least a portion of computing resources comprises a virtualization server for hosting a plurality of virtual machines.

7. A system, comprising:
one or more shared computing resources; and
a management platform configured to manage a cloud of computing resources comprising the one or more shared computing resources and one or more private computing resources, wherein the management platform comprises at least one processor and a memory storing instructions that when executed by the at least one processor cause the management platform to:
receive, from an agent configured to facilitate communications between the management platform and at least a portion of computing resources of a private zone of computing resources, a request to add the at least a portion of computing resources to the cloud; and
responsive to the request and a determination that addition of the at least a portion of computing resources to the cloud is authorized:
add the at least a portion of computing resources to the cloud;
generate an authentication token; and
communicate, to the agent, the authentication token.

8. The system of claim 7, wherein the instructions, when executed by the at least one processor, cause the management platform to receive and process a request to utilize one or more computing resources of the at least a portion of computing resources.

9. The system of claim 8, wherein the instructions, when executed by the at least one processor, cause the management platform to, responsive to a determination that the request to utilize is associated with the private zone, communicate, to the agent, commands for the one or more computing resources.

10. The system of claim 9, further comprising the agent, wherein the agent is configured to:
   receive, from the management platform, the commands for the one or more computing resources;
   translate the commands for the one or more computing resources into commands formatted for the one or more computing resources; and
   communicate, to the one or more computing resources, the commands formatted for the one or more computing resources.

11. The system of claim 8, wherein the instructions, when executed by the at least one processor, cause the management platform to determine that the request to utilize comprises at least one of the authentication token or information generated using the authentication token.

12. The system of claim 7, wherein the at least a portion of computing resources comprises a virtualization server configured to host a plurality of virtual machines.

13. One or more non-transitory computer-readable media having instructions stored thereon that when executed by one or more computers cause the one or more computers to:
   receive, from an agent associated with a private zone of computing resources and configured to facilitate communications between the one or more computers and at least a portion of computing resources of the private zone, a request to add the at least a portion of computing resources to a cloud of computing resources that is managed by the one or more computers and comprises shared computing resources and private computing resources; and
   responsive to the request and a determination that addition of the at least a portion of computing resources to the cloud is authorized:
      add the at least a portion of computing resources to the cloud;
      generate an authentication token; and
      communicate, to the agent, the authentication token.

14. The one or more non-transitory computer-readable media of claim 13, wherein the instructions, when executed by the one or more computers, cause the one or more computers to receive and process a request to utilize one or more computing resources of the at least a portion of computing resources.

15. The one or more non-transitory computer-readable media of claim 14, wherein the instructions, when executed by the one or more computers, cause the one or more computers to, responsive to a determination that the request to utilize is associated with the private zone, communicate, to the agent, commands for the one or more computing resources.

16. The one or more non-transitory computer-readable media of claim 14, wherein the instructions, when executed by the one or more computers, cause the one or more computers to determine that the request to utilize comprises at least one of the authentication token or information generated using the authentication token.

17. The one or more non-transitory computer-readable media of claim 13, wherein the at least a portion of computing resources comprises a virtualization server configured to host a plurality of virtual machines.

* * * * *